United States Patent [19]

Sellen et al.

[11] 4,338,610

[45] Jul. 6, 1982

[54] MODULAR-HEAD ENDORSER

[75] Inventors: Kenneth R. Sellen, Dearborn Heights; Jimmie Neill, Walled Lake; Eugene F. Banka, Livonia; William Barz, Bloomfield, all of Mich.

[73] Assignee: Burroughs Corporation, Detroit, Mich.

[21] Appl. No.: 178,875

[22] Filed: Aug. 18, 1980

[51] Int. Cl.³ .............................................. G01D 15/18

[52] U.S. Cl. .................................. 346/75; 346/140 R

[58] Field of Search .............. 346/75, 140 R, 140 PD, 346/140 IJ

[56] References Cited

U.S. PATENT DOCUMENTS

| | | | |
|---|---|---|---|
| 3,831,727 | 8/1974 | Kruspe et al. | 346/140 IJ X |
| 4,081,804 | 3/1978 | Van Breemen et al. | 346/75 |
| 4,097,872 | 6/1978 | Giordano et al. | 346/75 |
| 4,201,993 | 5/1980 | Ito et al. | 346/75 |
| 4,268,836 | 5/1981 | Huliba et al. | 346/75 |
| 4,277,790 | 7/1981 | Heibein et al. | 346/75 |

OTHER PUBLICATIONS

*IBM Technical Disclosure Bulletin,* vol. 17, No. 9, Feb. 1975, pp. 2622–2623, "Cassette Ink Jet Head", 346-375.

*Primary Examiner*—Joseph W. Hartary
*Assistant Examiner*—W. J. Brady
*Attorney, Agent, or Firm*—Kevin R. Peterson; Charles E. Quarton; Kenneth J. Cooper

[57] ABSTRACT

A modular-head endorser includes a plurality of mateable modules which form an ink jet printer. These modules cooperate to expel drops of printing fluid, direct them to a printing surface, and recirculate excess drops to a fluid supply. Some of the modules are joined together without tools so the user of the invention can quickly and easily clean, replace, and assemble certain modules without additional assistance.

5 Claims, 4 Drawing Figures

MODULAR-HEAD ENDORSER

BACKGROUND OF THE INVENTION

1. Field of the Invention

This invention relates to a modular-head endorser for an ink jet printer.

2. History of the Prior Art

Ink jet printer systems continue to be designed for ever decreasing spaces. Technology works to optimize the performance, features, and efficiency of these smaller units. However, simplicity of maintenance is also desirable so a system operator can clean and replace defective parts without summoning additional personnel.

Prior systems included an assembly of components which failed to efficiently use the available space. A drop generator expelled drops of charged printing fluid which were subsequently directed by charged deflection plates to a printing surface. A droplet catcher received expelled drops which were not deflected to the printing surface. These drops were recirculated to a supply of printing fluid for the drop generator.

The invention utilizes a plurality of modules assembled into a unit to provide an ink jet printer which is easily serviceable by the system operator. The modular approach permits improved manufacture and coordination of the self-contained units to yield better performing and higher quality ink jet printers.

SUMMARY OF THE INVENTION

A modular-head endorser for an ink jet printer expels drops of printing fluid with a droplet generator module secured to a primary module. A primary, first deflection, second deflection, and secondary module are mateable and secured by hand to a base module.

The drops of printing fluid are expelled from the droplet generator module to be electrically charged and funnelled between the second deflection and first deflection modules to a printing surface. Electrical energy, transmitted to these deflection modules, varies electrical forces which deflect the expelled drops of charged printing fluid to form the intended characters.

DETAILED DESCRIPTION

Figure 1:
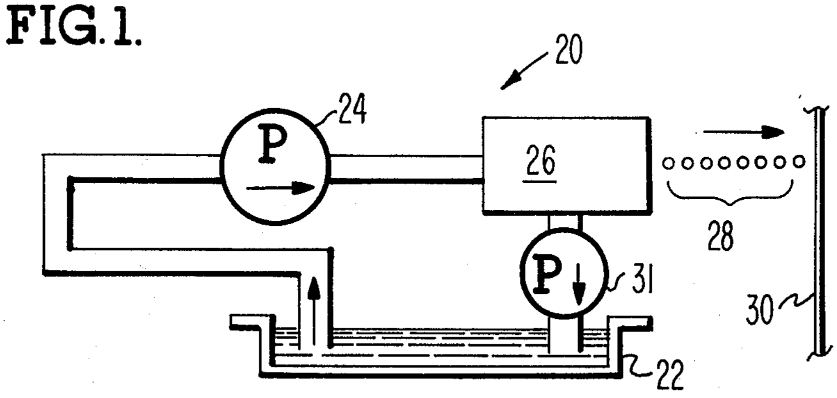
FIG. 1 generally depicts an ink jet printer system.

FIG. 1 generally shows an ink jet printing system 20 having a supply 22 of printing fluid and a device 24 for pumping the printing fluid from supply 22. The pumped printing fluid is transmitted to a modular-head endorser 26 which generates drops 28 for printing on a surface 30 during a printing cycle and recirculates excess printing fluid to the supply 22 during a nonprinting cycle via vacuum pump 31. The ink jet printing system 20 requires steady fluid pressure as well as contaminant and air-free printing fluid. Developed systems for meeting these requirements are disclosed in co-pending patent applications entitled "A Fluid Pump System for an Ink Jet Printer" by Alexander Goldis, et al, Ser. No.

150,731, Filed May 19, 1980, now U.S. Pat. No. 4,320,407 and "A Continuous Deaeration System for a Fluid Pump System" by Alexander Goldis, et al, Ser. No. 150,732, Filed May 19, 1980.

Figure 2:
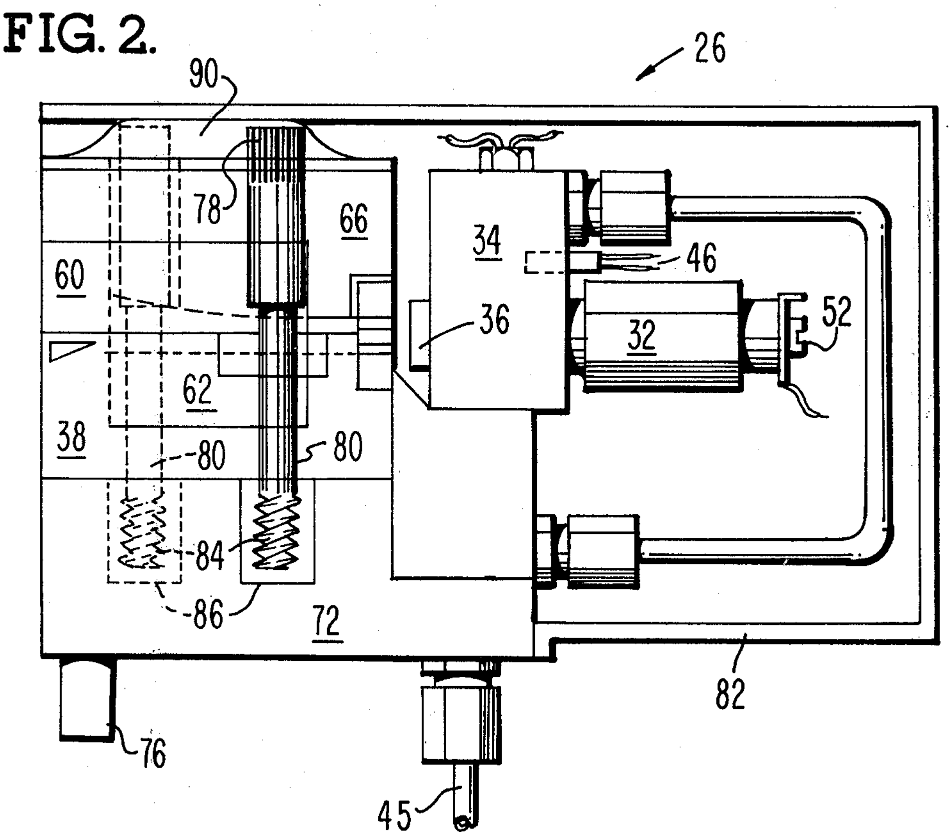
FIG. 2 is a block diagram of a modular-head endorser.
Figure 3:
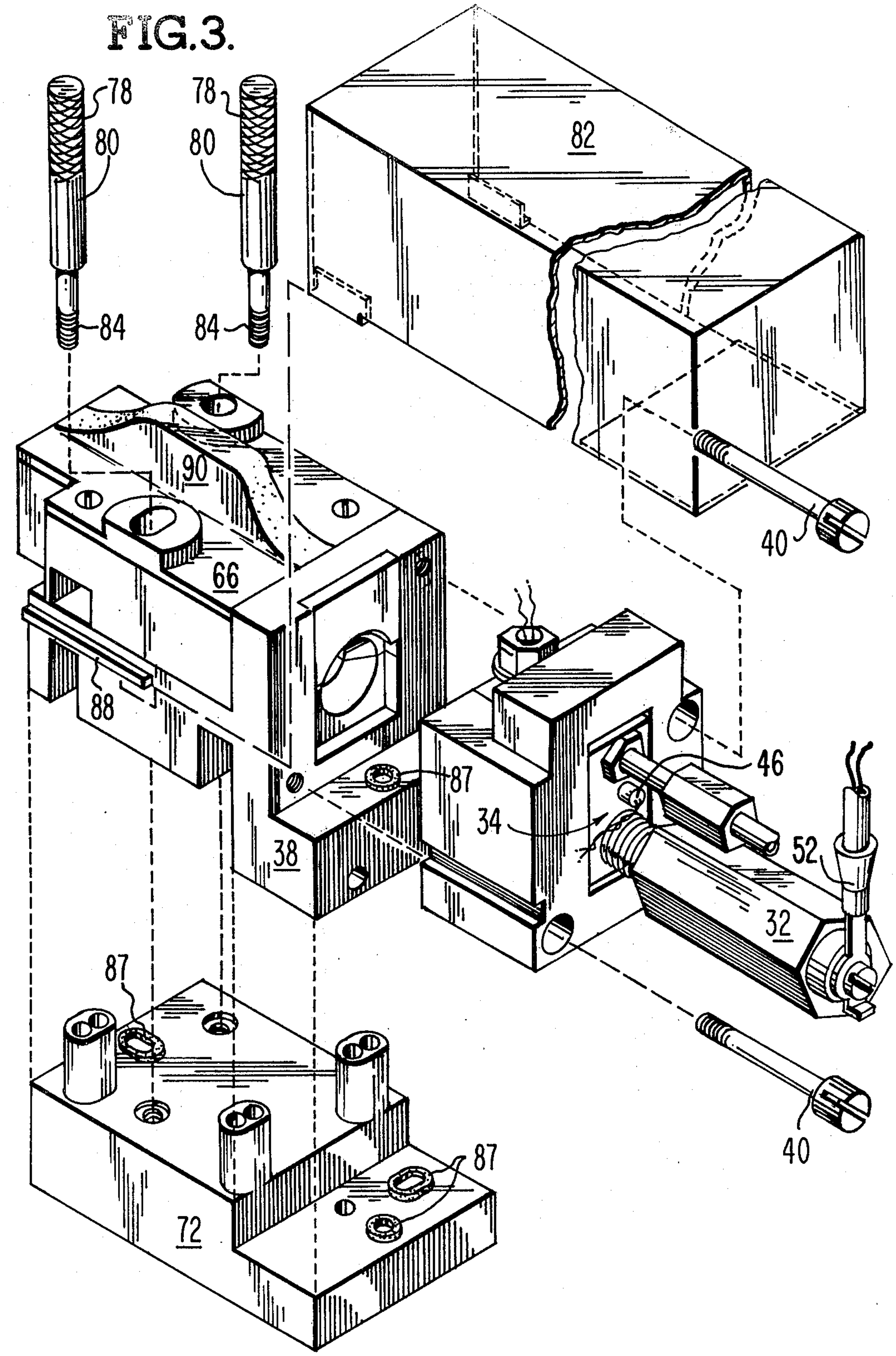
FIG. 3 depicts the assembly of the drop generator module with modules of the modular-head endorser.
Figure 4:
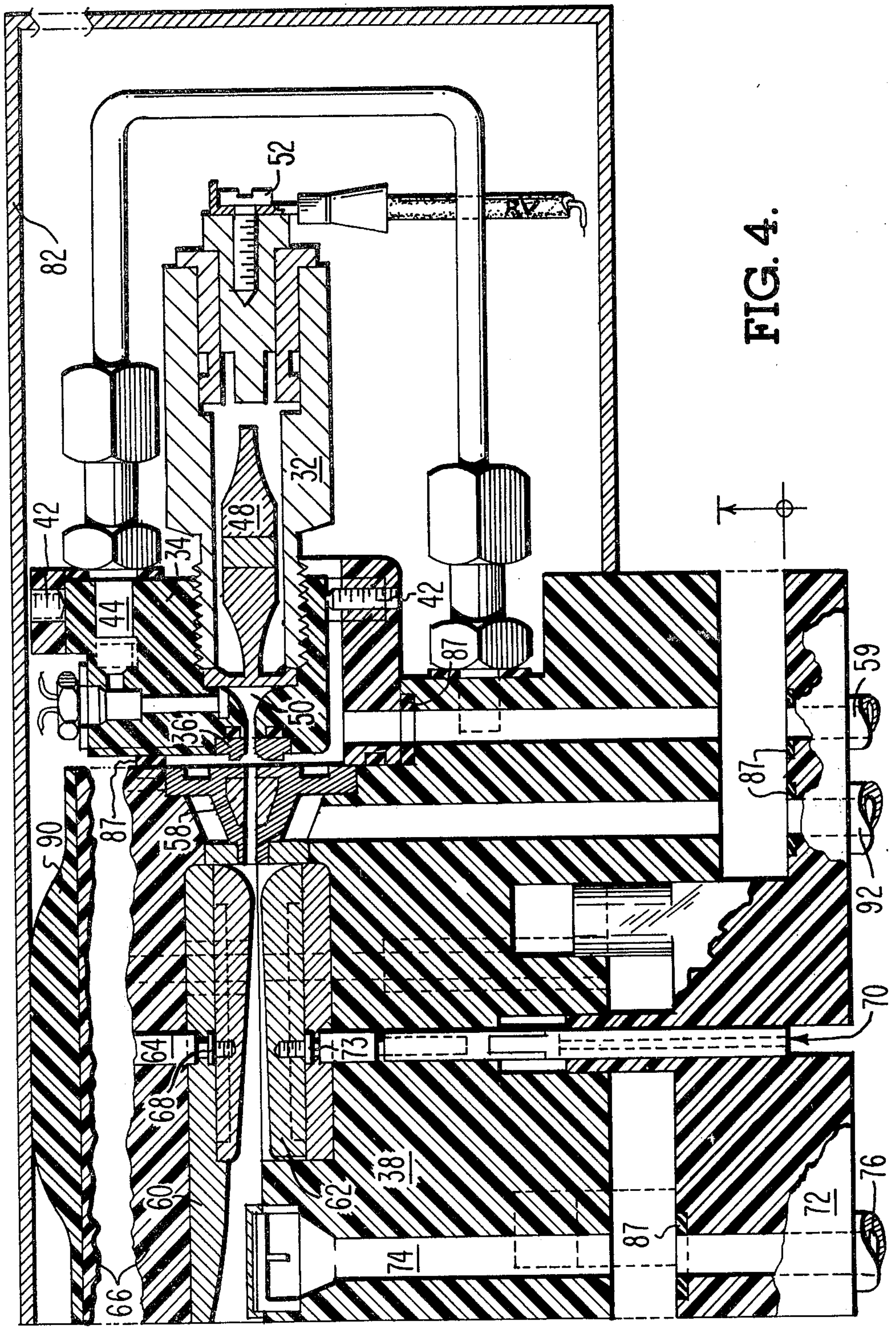
FIG. 4 is a sectional view of the modular-head endorser.

The block diagram in FIG. 2 illustrates the placement of the modules which form the modular-head endorser 26. A droplet generator module includes a droplet generator 32, a reservoir 34 for storing and heating printing fluid, and a jewel 36 with an orifice through which printing fluid is expelled. The droplet generator module as shown in FIG. 3 is secured in place to primary module 38 by screws 40 and is directionally adjustable with set screws 42 (FIG. 4) to properly aim expelled drops of printing fluid.

Printing fluid enters the droplet generator module through entrance port 44 from supply line 45 (FIG. 2). Reservoir 34 is heated through electrical coupling 46 to increase the susceptibility of the fluid to drop formation and uninterrupted flow of printing fluid from the droplet generator 32. The heated printing fluid is transmitted to the face of the oscillator element 48 (FIG. 4) at chamber 50. Electrical input 52 conducts electrical energy to oscillator element 48 which vibrates to transform the fluid in chamber 50 to fluid drops. The fluid in the form of drops passes through, and is electrically charged by, electrode 58 so that subsequent exposure to electrical fields will appropriately deflect the charged drops for printing or recirculation to the supply 22 (FIG. 1) of printing fluid. The stream of charged drops of printing fluid passes through a channel between a second deflection module 60 (FIG. 4) and a first deflection module 62. The deflection modules receive opposite voltages to generate the electrical field for deflecting the drops. Voltages are transmitted to the second deflection module 60 by a secondary electrical socket 64 embedded in the secondary module 66. This secondary electrical socket 64 mates with a secondary electrical stud 68 housed in the second deflection module 60.

Voltage opposite to that supplied to the second deflection module 60 is delivered to the first deflection module 62 through a primary electrical socket 70 within the base 72 module and extending through primary 38 module. A primary electrical stud 73, embedded in the first deflection module 62, mates with the primary electrical socket 70 to conduct the voltage to the first deflection module 62.

The primary module 38 houses a printing fluid drop catcher assembly 74 (The catcher assembly is the subject of the pending application entitled "Ink Droplet Catcher Assembly" by Ronald G. Shell, et al, Ser. No. 127,921, Filed Mar. 6, 1980, now U.S. Pat. No. 4,286,274.) which conducts the captured drops to a drain tube 76 in the base module 72 for recirculation via vacuum pump 31 (FIG. 1) to the supply 22 of printing fluid.

Consulting FIG. 2, the secondary 66, second deflection 60, first deflection 62, primary 38 and base 72 modules are releasably secured together by hand using the knurled upper portion 78 of threaded rods 80 and shroud 82. Rod 80 has a threaded lower portion 84 which extends through secondary module 66 to secure primary 38 and first deflection 62 modules to base module 72 by engaging threaded socket 86. Gaskets 87 (FIG. 3) on base module 72 resiliently deform as threaded rods 80 are rotated into threaded socket 86. The deformed gaskets 87 form seals between the base 72 and primary 38 modules to prevent printing fluid leakage at the module interface.

Shroud 82 is slideable over modular head endorser 26 to secure secondary 66 and second deflection 60 modules to primary module 38 by a compressive force. This force is applied when an operator slides shroud 82 (FIG. 3) into engagement with shelves 88 on primary module 38 and continues forward movement of shroud 82 over fin 90 on secondary module 66. Fin 90 upwardly forces shroud 82 against shelves 88 to yield the compressive force.

Airborne contaminants are inhibited from entering the channel between second 60 (FIG. 4) and first 62 deflection modules by injecting clean, pressurized air through intake port 92. The pressurized air enters base module 72, is ducted through primary module 38, and is expelled into the channel between the second 60 and first 62 deflection modules. The air then flows into printing fluid drop catcher assembly 74 and out of the modular-head towards a printing surface. As a result, air drag on fluid drops expelled from the droplet generator 32 is reduced as well as splash-back from drops impacting a printing surface.

What is claimed is:

1. A modular-head endorser for an ink jet printer system comprising:

a droplet generator module, for expelling drops of printing fluid;

means for charging the expelled drops of printing fluid for deflection by an electrical field; and a plurality of mateable modules, the modules including:

a base module mateable with a primary module;

a primary module engageable with the droplet generator module;

a first deflection module above which the charged drops of printing fluid are expelled, the first deflection module being mateable with the primary module;

a second deflection module below which the charged drops of printing fluid are expelled, the second deflection module being mateable with the first deflection module;

means for transmitting electrical energy to the second deflection and first deflection modules for generating an electrical field to deflect expelled, charged drops of printing fluid;

a secondary module mateable with the second deflection module; and means for releasably securing the primary, first deflection, second deflection and secondary modules to the base module;

wherein the means for releasably securing the primary, first deflection, second deflection, and secondary modules to the base module comprises:

a shroud to secure the second and first deflection modules to the primary module;

a threaded rod, finger tightenable, to secure the primary and first deflection modules to the base module; and a plurality of gaskets between the modules.

2. The invention of claim 1, wherein the droplet generator module comprises:

a jewel having an orifice, the jewel being adjustable for altering the path of expelled drops of printing fluid;

an oscillator for forming drops of printing fluid;

a reservoir for storing printing fluid to be expelled by the oscillator; and means for heating the reservoir to a predetermined temperature.

3. The invention of claim 1, wherein the base module comprises:

means for applying a vacuum to the primary module;

means for introducing pressurized air to the plurality of mateable modules;

means for conducting printing fluid to the droplet generator module;

a stud through which electrical energy is conducted to the first deflection module; and a threaded socket for engaging the threaded rod for securing the primary and first deflection modules to the base module.

4. The invention of claim 1, wherein the primary module comprises:

an ink drop catcher assembly for capturing expelled drops of printing fluid during a nonprinting cycle;

a socket through which electrical energy is conducted from the base module to the first deflection module;

means for transmitting the threaded rod for securing the primary and first deflection modules to the base module;

a projection for engaging the shroud which secures the secondary and second deflection modules to the primary module; and means for venting pressurized air between the second deflection and first deflection modules.

5. The invention of claim 1, wherein the secondary module comprises:

a socket through which electrical energy is conducted to the second deflection module;

means for transmitting the threaded rod for securing the primary and first deflection modules to the base module; and a fin for elastically deforming the shroud which secures the secondary and second deflection modules to the primary module.

* * * * *